(12) United States Patent
Joyce

(10) Patent No.: US 11,084,651 B2
(45) Date of Patent: Aug. 10, 2021

(54) TEMPORARY BULKHEAD FOR SHIPPING CONTAINER

(71) Applicant: BASELINX LLC, Penfield, NY (US)

(72) Inventor: Michael Ross Joyce, Penfield, NY (US)

(73) Assignee: Baselinx LLC, Penfield, NY (US)

( * ) Notice: Subject to any disclaimer, the term of this patent is extended or adjusted under 35 U.S.C. 154(b) by 0 days.

(21) Appl. No.: 16/742,837

(22) Filed: Jan. 14, 2020

(65) Prior Publication Data
US 2020/0324965 A1   Oct. 15, 2020

Related U.S. Application Data

(63) Continuation-in-part of application No. 16/531,933, filed on Aug. 5, 2019.
(Continued)

(51) Int. Cl.
*B65D 90/00* (2006.01)
*B60P 7/14* (2006.01)

(52) U.S. Cl.
CPC .......... *B65D 90/0066* (2013.01); *B60P 7/14* (2013.01)

(58) Field of Classification Search
CPC ............. B65D 1/42; B65D 2203/10; B65D 2590/005; B65D 81/05; B65D 88/121;
(Continued)

(56) References Cited

U.S. PATENT DOCUMENTS 2,715,040 A * 8/1955 Rhoads, Sr. .............. B60P 7/14
410/140
4,880,342 A * 11/1989 Pradovic ................... B60P 7/14
410/121
(Continued)

FOREIGN PATENT DOCUMENTS

AU    2007201346    4/2007
AU       344029    8/2012
(Continued)

*Primary Examiner* — D Glenn Dayoan
*Assistant Examiner* — Sunsurraye Westbrook
(74) *Attorney, Agent, or Firm* — Woods Oviatt Gilman LLP; Katherine H. McGuire, Esq.

(57) ABSTRACT

A double door temporary bulkhead locking member comprising a single or joined rigid material with the angle apex pointing inward. The temporary bulkhead is wedged across the width of the inside opening of a container. When the flowable product is installed into the container the pressure on the bulkhead is transferred to the outer edges sealing the product into the container. The temporary bulkhead material has a series of creases, notches, slots and shapes that are folded and locked into the proprietary shape. A single door bulkhead locking member comprising a single or joined rigid material as a straight plain panel to fit into the single doorway of a shipping container. The temporary bulkhead is wedged across the width of the inside opening of a container when one door is closed and the other open. When the flowable product is installed into the container the pressure on the bulkhead is transferred to the outer edges sealing the product into the container. The temporary bulkhead material has a series of creases, notches, slots and shapes that are folded and locked into the proprietary shape.

18 Claims, 22 Drawing Sheets

Related U.S. Application Data

(60) Provisional application No. 62/714,257, filed on Aug. 3, 2018, provisional application No. 62/742,031, filed on Oct. 5, 2018.

(58) Field of Classification Search
CPC ............ B65D 90/0026; B65D 90/0053; B65D 90/006
USPC ....... 410/140, 121, 127, 129, 130, 132, 135, 410/154, 156
See application file for complete search history.

(56) References Cited

U.S. PATENT DOCUMENTS

| | | | |
|---|---|---|---|
| 5,374,464 A * | 12/1994 | Jacobsen | B60P 7/135 |
| | | | 410/121 |
| 5,624,095 A | 4/1997 | Zissu | |
| 5,678,715 A | 10/1997 | Sjostedt et al. | |
| D488,620 S | 4/2004 | McAlpine et al. | |
| 7,357,611 B2 | 4/2008 | Faivre et al. | |
| D663,954 S | 7/2012 | Auster | |
| 8,995,605 B2 | 3/2015 | Chang | |
| 9,157,572 B1 | 10/2015 | Merideth | |
| 9,605,435 B2 | 3/2017 | Glick, Jr. | |
| 10,246,212 B2 * | 4/2019 | Beck | B62M 17/00 |
| 2006/0175491 A1 | 8/2006 | Hays | |
| 2007/0251944 A1 | 11/2007 | Joyce et al. | |

FOREIGN PATENT DOCUMENTS

| | | |
|---|---|---|
| AU | 344102 | 8/2012 |
| AU | 2012201212 | 9/2012 |
| AU | 2013200849 | 3/2013 |
| AU | 2012232949 | 4/2014 |
| AU | 2014100638 | 7/2014 |
| WO | 2007033420 | 3/2007 |

* cited by examiner

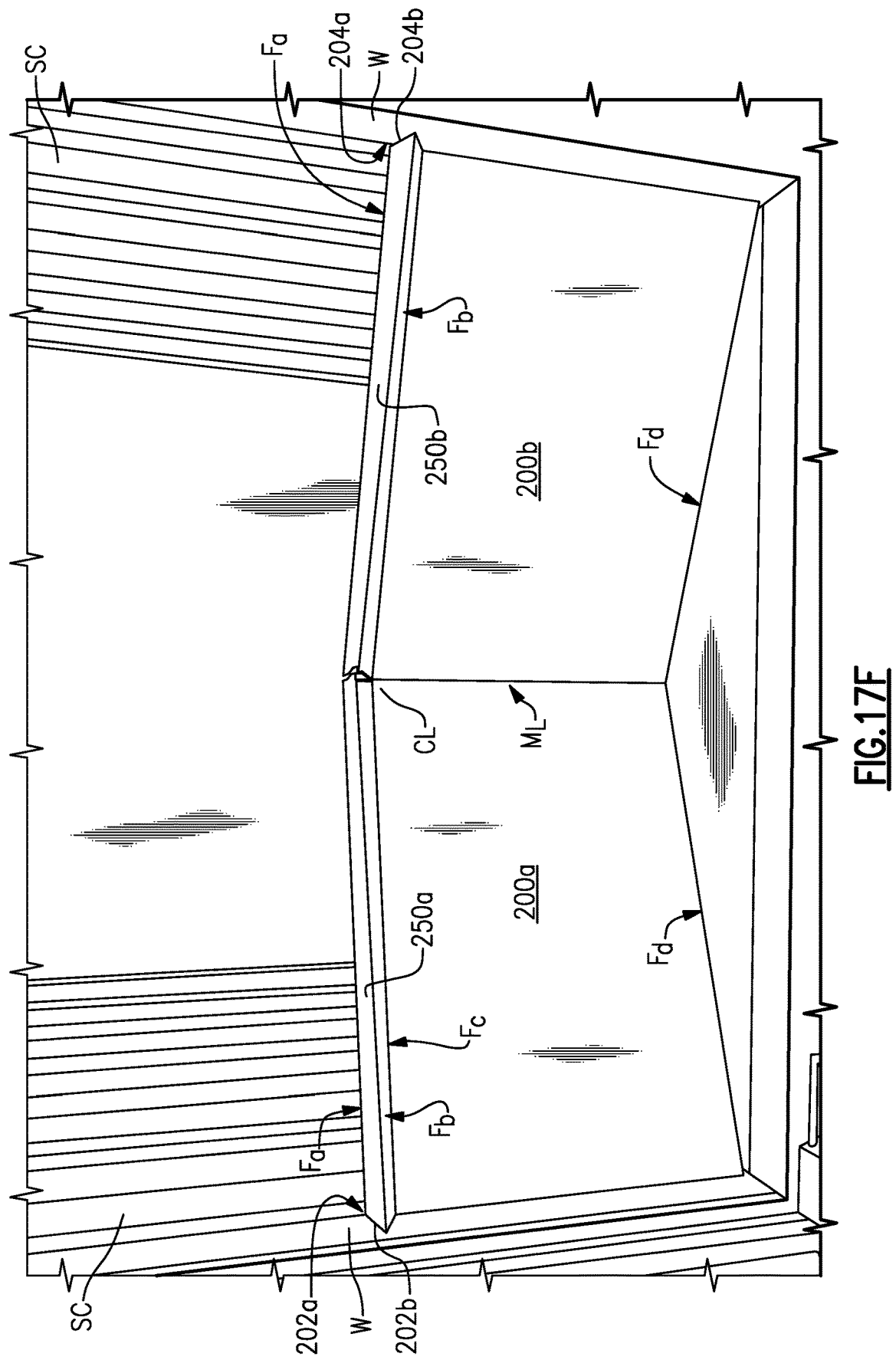

TEMPORARY BULKHEAD FOR SHIPPING CONTAINER

BACKGROUND OF THE INVENTION

The present invention relates to temporary bulkheads for shipping containers.

Shipping containers are well known and are typically in the form of a large rectangular box made of strong materials such as, for example, corrugated steel, aluminum, and fiber-reinforced polymers. Access to the container may be provided by double doors which are hinged to one open end of the container. These types of shipping containers are used to ship all types of durable goods by all modes of transportation including truck, air, rail and ship. The containers are mostly identical in form so that they are easily stackable.

Solid form goods are easily loaded into and out of the shipping container through the double door access. Goods which exhibit fluidic characteristics when in bulk form (e.g., free flowing bulk grains, formed pellets as seen in certain animal feeds, loose flowing soils, minerals, ores and other substances of like flowable character) are also shipped in these containers but the loading and unloading process is a bit more difficult. As the flowable product is deposited into the container, something must be placed at the point of entry to prevent the material from flowing outside the container, particularly if the container is to be filled to capacity.

Temporary bulkheads for shipping containers have been proposed and may be seen in AU2007201346A1, for example.

SUMMARY OF THE INVENTION

In a first embodiment, the present invention provides a double door temporary bulkhead locking member comprising a single or joined rigid material with the angle apex pointing inward. The temporary bulkhead is wedged across the width of the inside opening of a container. When the flowable product is installed into the container the pressure on the Bulkhead is transferred to the outer edges sealing the product into the container.

The temporary bulkhead material has a series of creases, notches, slots and shapes that are folded and locked into the proprietary shape.

A Single Door bulkhead locking member comprising a single or joined rigid material as a straight plain panel to fit into the single doorway of a shipping container. The temporary bulkhead is wedged across the width of the inside opening of a container when one door is closed and the other open. When the flowable product is installed into the container the pressure on the Bulkhead is transferred to the outer edges sealing the product into the container.

The temporary bulkhead material has a series of creases, notches, slots and shapes that are folded and locked into the proprietary shape.

DESCRIPTION OF THE DRAWING FIGURES

The patent or application file contains at least one drawing executed in color. Copies of this patent or patent application publication with color drawing(s) will be provided by the Office upon request and payment of the necessary fee.

The above-mentioned and other features and advantages of this invention, and the manner of attaining them, will become apparent and be better understood by reference to the following description of the invention in conjunction with the accompanying drawing, wherein:

FIG. 17F is a photograph showing the double door temporary bulkhead of FIGS. 17A-17F in the folded condition and installed in the opening of a shipping container in the intended manner.

DETAILED DESCRIPTION OF PREFERRED EMBODIMENTS

Figure 1A:
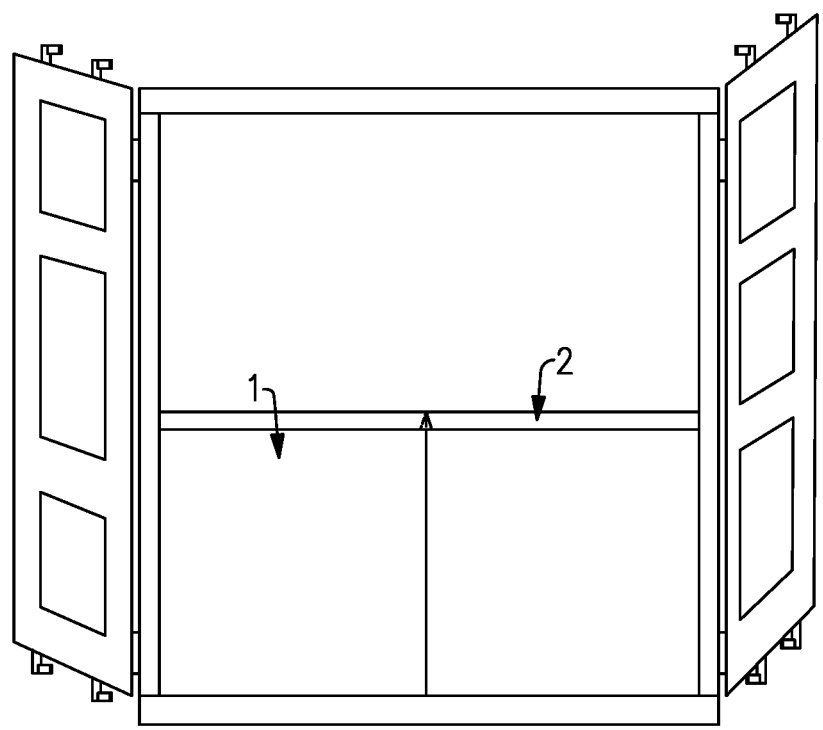
FIG. 1A is a perspective view of the installed temporary bulkhead invention wedged into the open container in the intended manner with both hinged container doors open.

FIG. 1A-1 is the main upright rigid material of the temporary bulkhead made to various heights for the given flowable product.

Reference number 2 is the creased and folded profile of the top of the temporary bulkhead as seen in FIGS. 1B, 2A, 2B, and 2C.

Figure 1B:
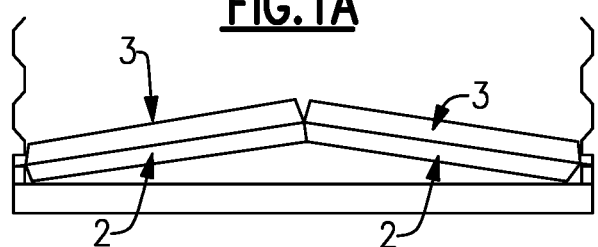
FIG. 1B is a top view showing the installed position of the temporary bulkhead invention of FIG. 1A in the sides of the shipping container.

FIG. 1B reference number 3 is the bottom extra support/hold-down flaps that are attached to the bottom of the inside panel where the flowable product is placed against the temporary bulkhead. (see FIG. 2C).

Figure 2A:
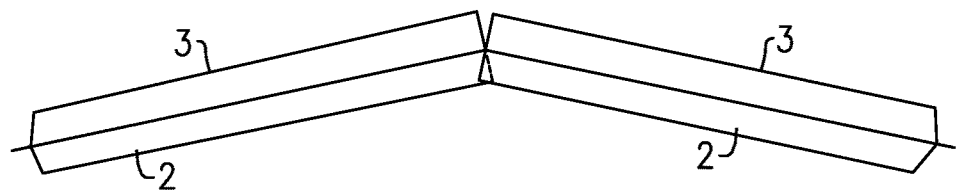
FIG. 2A is the top view of the temporary bulkhead as if it was installed.
Figure 2B:
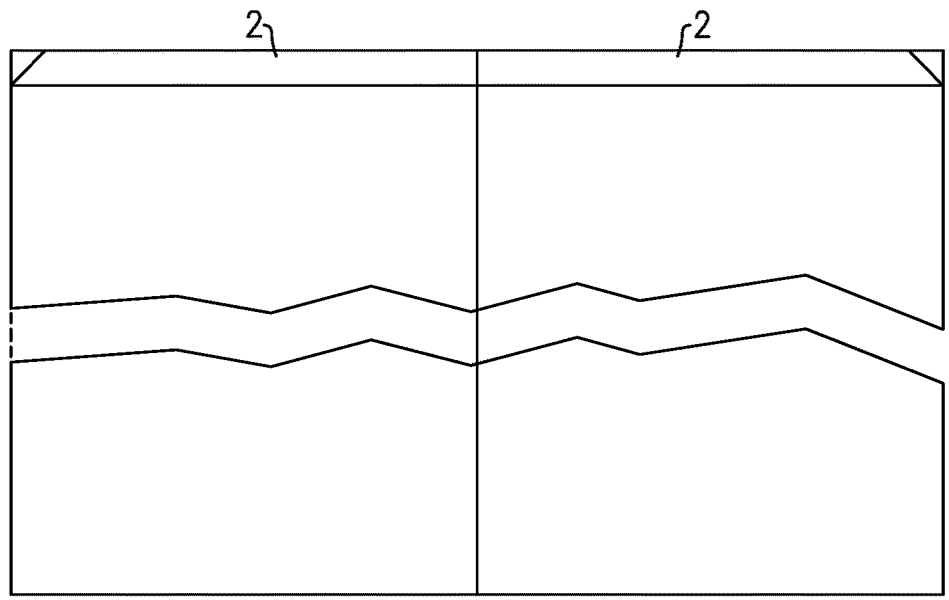
FIG. 2B is the front view of the temporary bulkhead before it is wedged into the container.
Figure 2C:
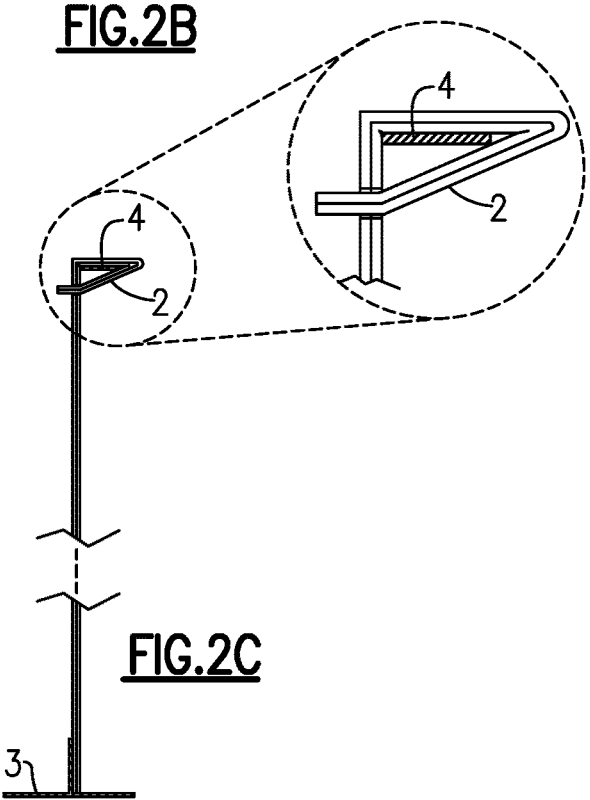
FIG. 2C is the side/end view of the temporary bulkhead profile.
Figure 3A:
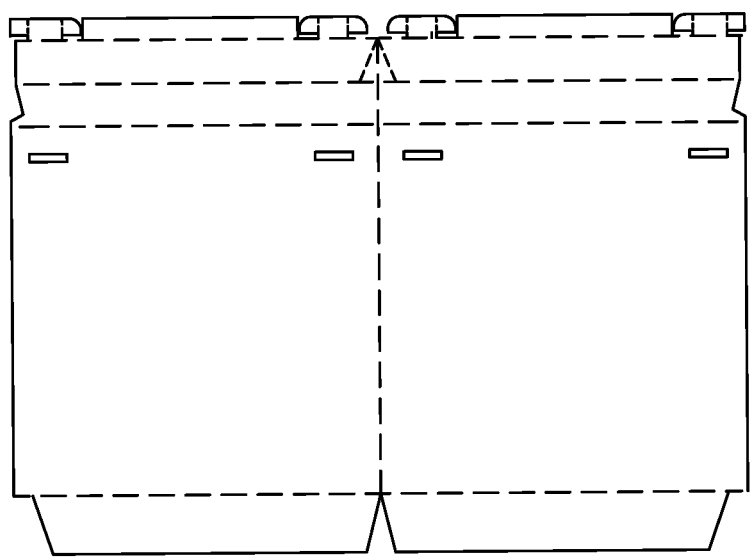
FIG. 3A is the cutout/creased outline of the temporary bulkhead material.
Figure 3B:
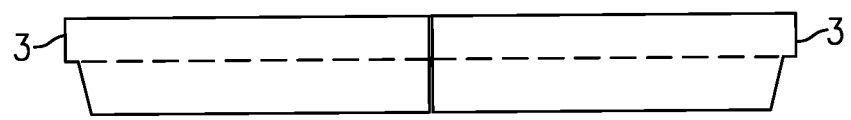
FIG. 3B is the extra support/hold-down flaps that are attached to the bottom of the inside panel where the flowable product is placed against the temporary bulkhead. (see FIG. 2C).

FIG. 2C and enlarged call-out drawing is the strengthening section substrate 4 used where added strength is required. These are located is each folded section on both sides of the center vertical crease.

Figure 4:
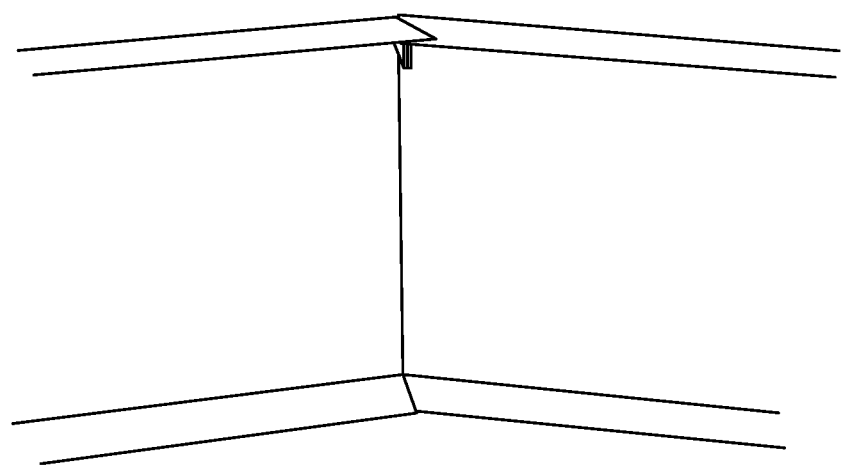
FIG. 4 is a perspective drawing of the circled section on FIG. 2B.

FIG. 4 is a perspective drawing of the circled section on FIG. 2B. The design here is such that the angled creases fold down and when the temporary bulkhead is collapsed/folded into the container opening they act as buffer stoppers to stop the temporary bulkhead from folding any further, thus locking/holding the bulkhead in place in the container.

Figure 5A:
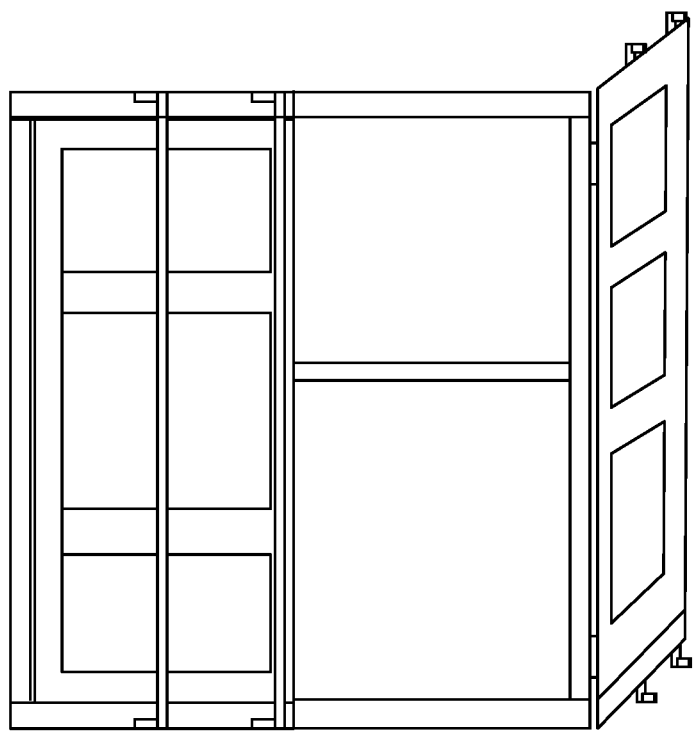
FIG. 5A is a perspective view of the installed temporary bulkhead invention wedged into the single open doorway of the container in the intended manner with one hinged container doors closed and the other open.

FIG. 5A is a perspective view of the installed temporary bulkhead invention wedged into the single open doorway of the container in the intended manner with one hinged container doors closed and the other open.

Figure 5B:
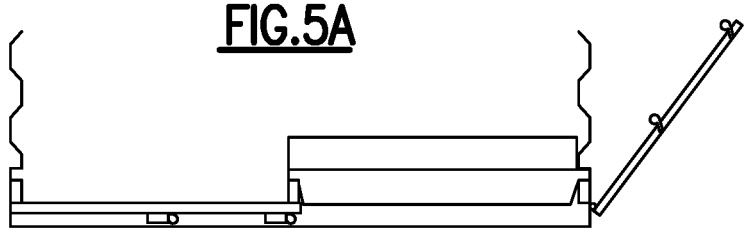
FIG. 5B is a top view showing the installed position of the temporary bulkhead invention of FIG. 5A in the single open doorway of the shipping container.
Figure 6A:
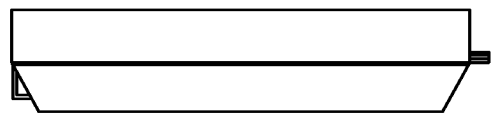
FIG. 6A is the top view of the single door temporary bulkhead.
Figure 6B:
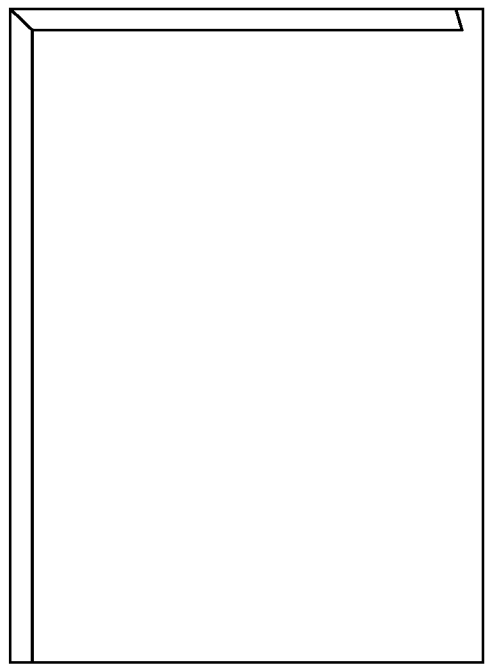
FIG. 6B is the front view of the temporary bulkhead before it is wedged into the container.
Figure 6C:
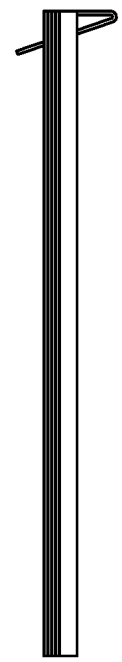
FIG. 6C is the side/end view of the temporary bulkhead before it is wedged into the container.

FIG. 5B is a top view showing the installed position of the temporary bulkhead invention of FIG. 5A in the single open doorway of the shipping container.

Figure 7A:
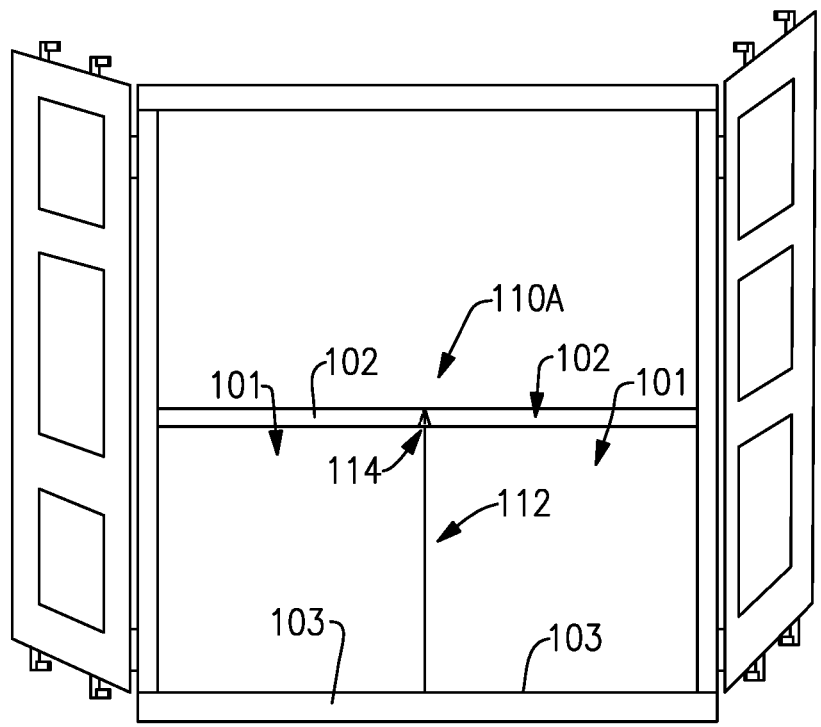
FIG. 7A is a perspective view of the installed temporary bulkhead invention wedged into the open container in the intended manner with both hinged container doors open.
Figure 7B:
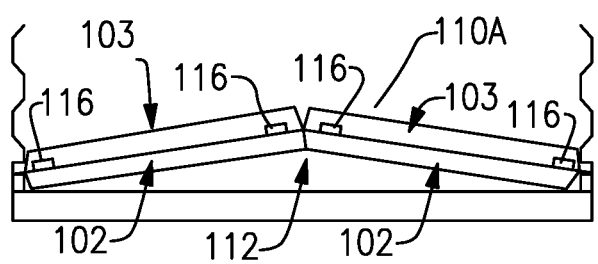
FIG. 7B is a top view showing the installed position of the temporary bulkhead invention of FIG. 7A in the sides of the shipping container.
Figure 14:
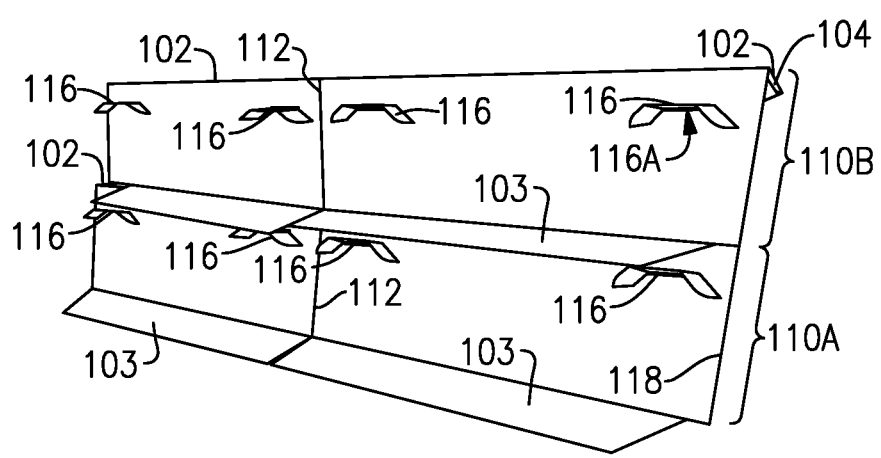
FIG. 14 is a front perspective view of two temporary bulkhead panels stacked one on the other.
Figure 15:
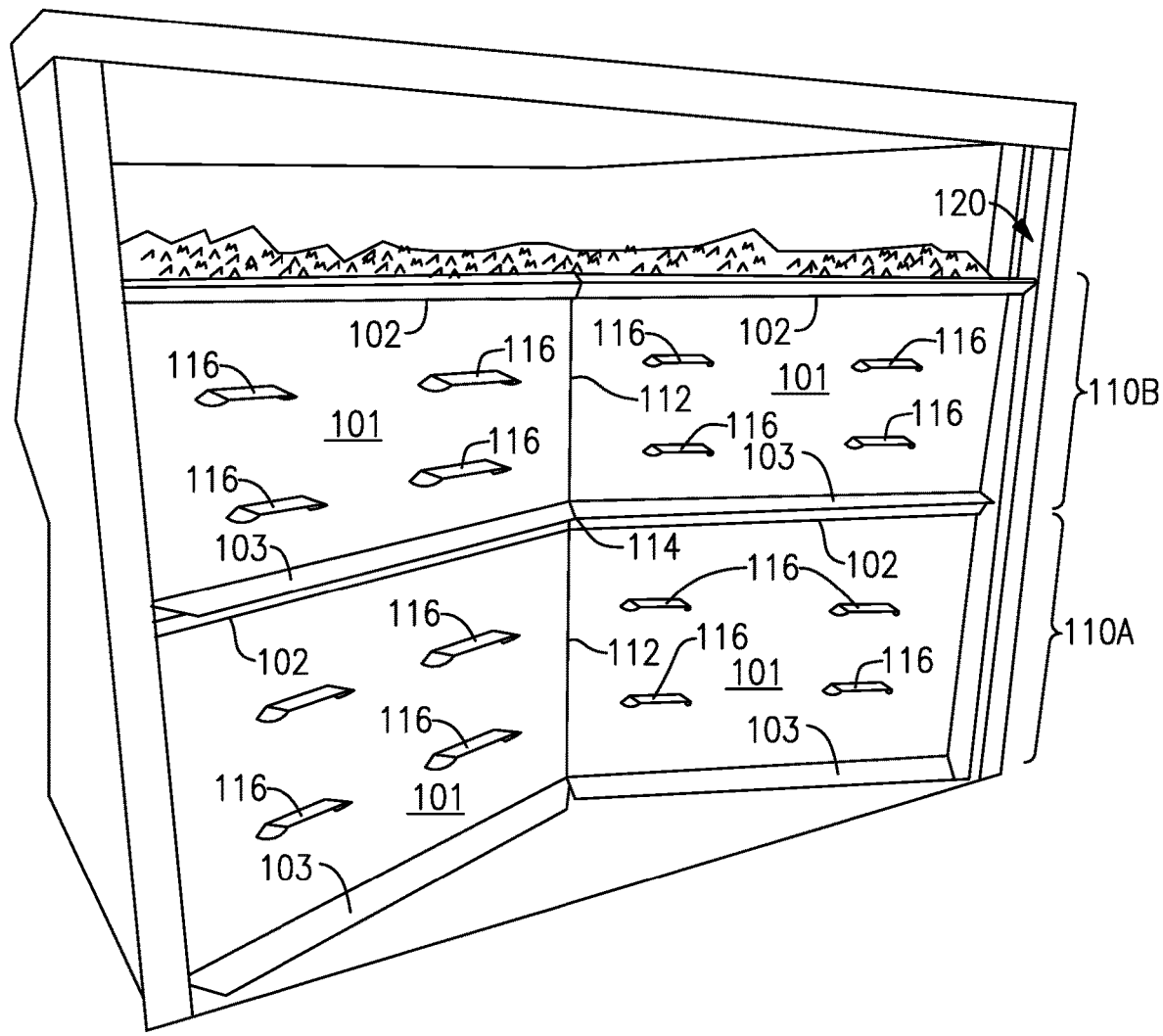
FIG. 15 is a front perspective view showing two stacked temporary bulkhead panels positioned in the opening of a storage frame in the intended manner.

Attention is turned to further preferred embodiments. A single temporary bulkhead 110A is seen in FIG. 7A and is the main upright rigid material for removably securing in a double door container opening and may be made to various heights for the given flowable product. Two identical temporary bulkheads 110A and 110B are seen in FIGS. 14 and 15 with bulkhead 110B stacked upon bulkhead 110A. Any number of bulkheads may be stacked in this manner to achieve the desired height in the container opening.

Reference numeral 102 shows the creased and folded profile of the top of the temporary bulkhead.

Reference numeral 103 is the bottom extra support/hold-down flaps that are attached to the bottom of the inside panel 101 where the flowable product is placed against the temporary bulkhead.

Figure 8A:
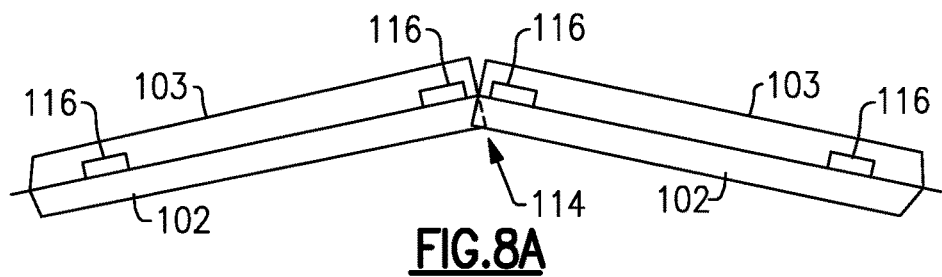
FIG. 8A is the top view of the temporary bulkhead in an installed position.
Figure 8B:
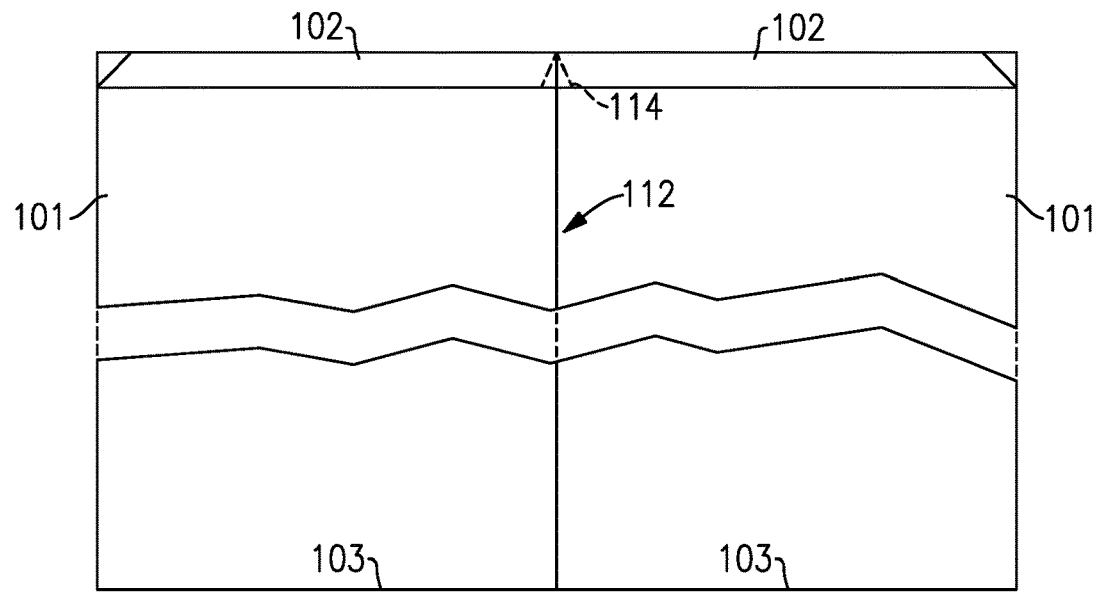
FIG. 8B is the front view of the temporary bulkhead before it is wedged into the container opening.
Figure 8C:
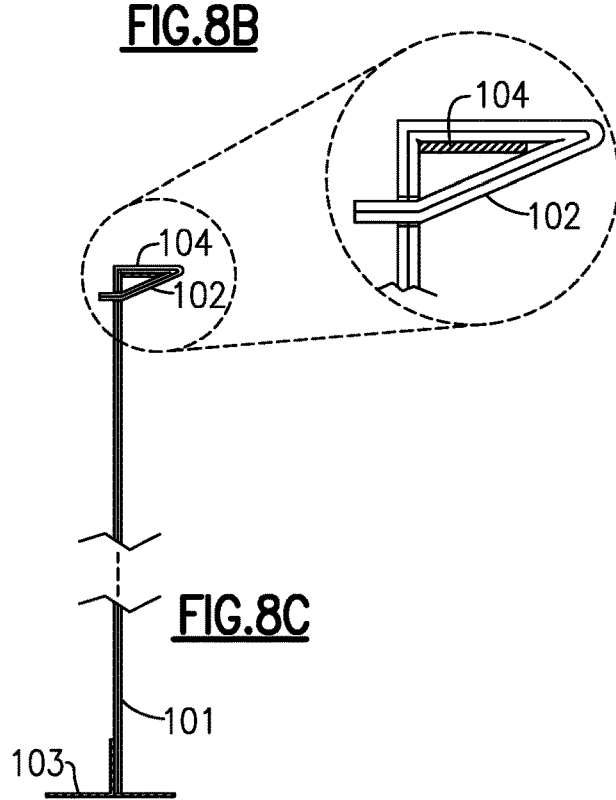
FIG. 8C is the side/end view of the temporary bulkhead profile.
Figure 9A:
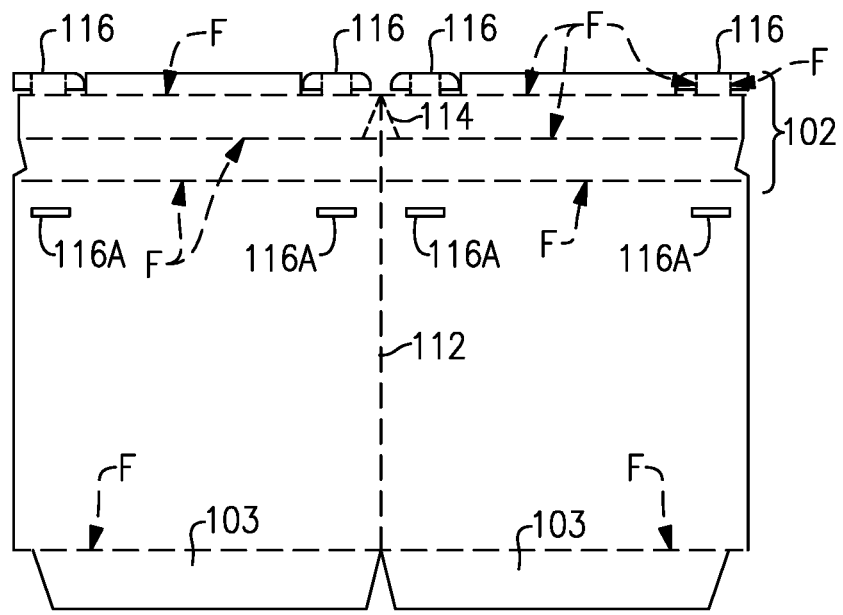
FIG. 9A is the cutout/creased outline of the temporary bulkhead sheet material prior to assembly and installation in a container opening.
Figure 9B:
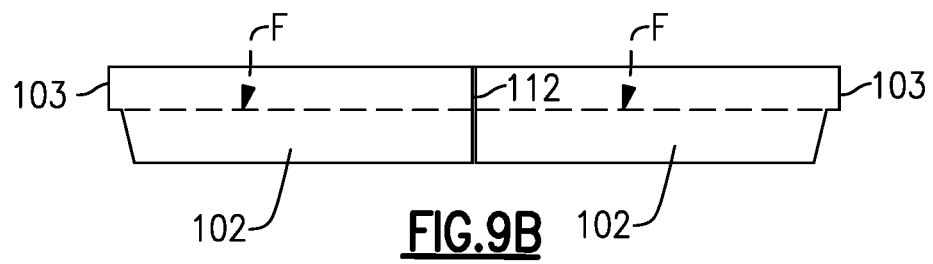
FIG. 9B is a top view of the assembled temporary bulkhead.

FIG. 8C and enlarged call-out drawing shows the strengthening section substrate 104 used where added strength is required. Rigid rectangular, elongated panels 104 may be inserted into each folded section 102 on both sides of the center vertical crease 112.

Figure 10:
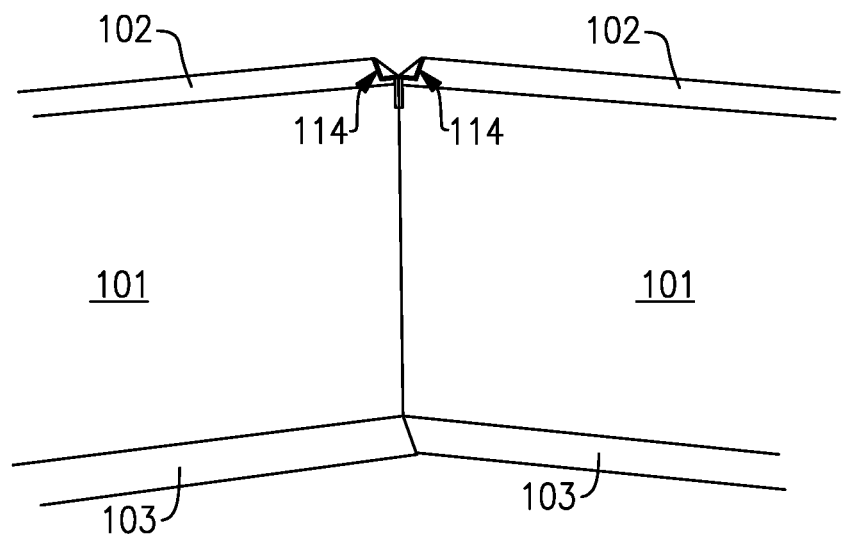
FIG. 10 is a perspective drawing including the circled section of FIG. 8B.

FIG. 10 best shows the angled creases fold down 114 and when the temporary bulkhead is collapsed/folded into the container opening they act as buffer stoppers to stop the temporary bulkhead from folding any further, thus locking/holding the bulkhead in place in the container.

Figure 11A:
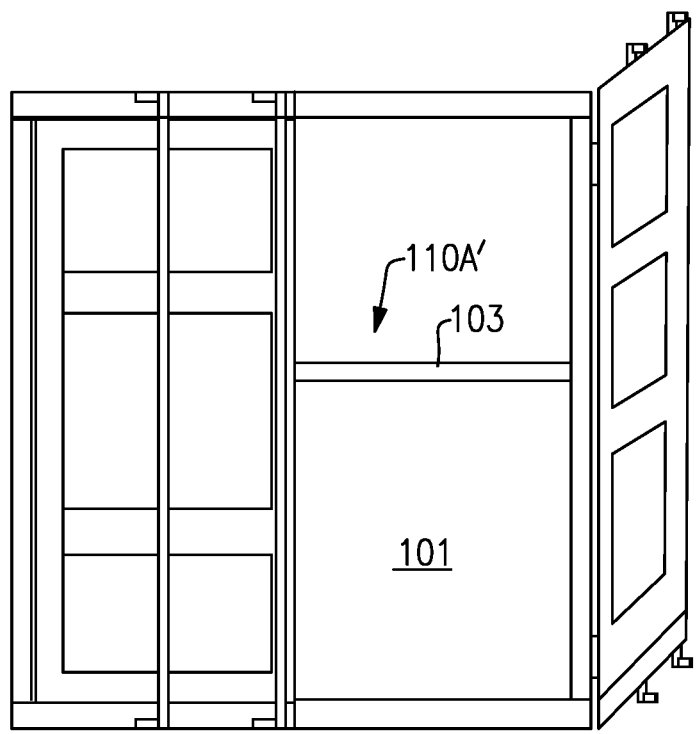
FIG. 11A is a perspective view of the installed temporary bulkhead invention wedged into the single open doorway of the container in the intended manner with one hinged container doors closed and the other open.

FIG. 11A is a perspective view of a version 110A' of the installed temporary bulkhead invention (110A' is essentially one half of a double bulkhead 110A—with no need for center crease 112) wedged into the single open doorway of the container in the intended manner with one hinged container doors closed and the other open.

Figure 11B:
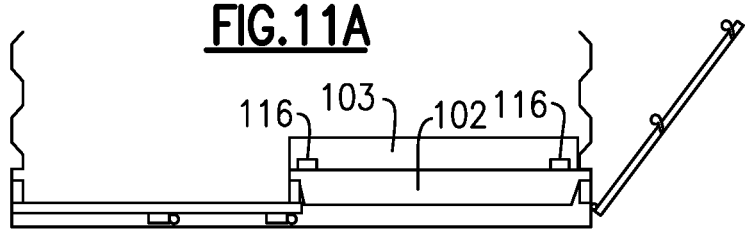
FIG. 11B is a top view showing the installed position of the temporary bulkhead invention of FIG. 11A in the single open doorway of the shipping container.
Figure 12A:
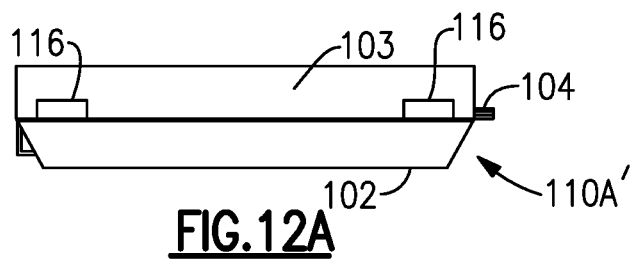
FIG. 12A is the top view of the single door temporary bulkhead.
Figure 12B:
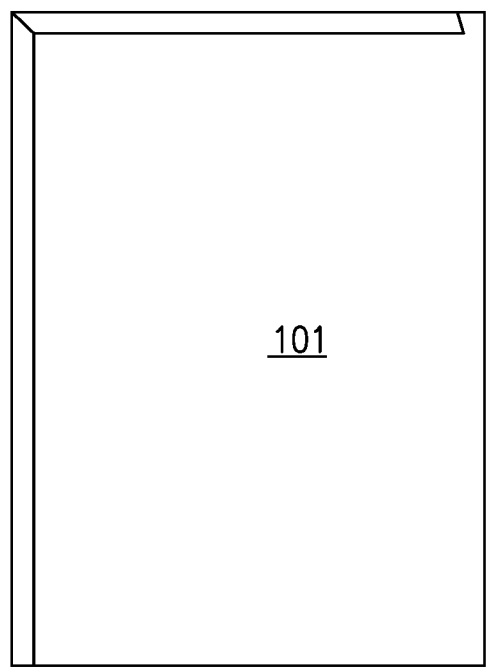
FIG. 12B is the front view of the temporary bulkhead before it is wedged into the container.
Figure 12C:
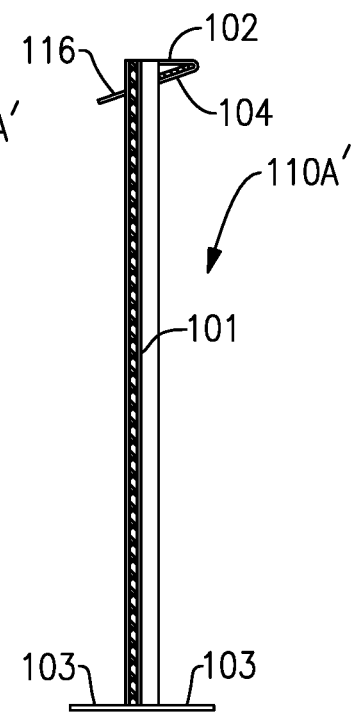
FIG. 12C is the side/end view of the temporary bulkhead before it is wedged into the container.
Figure 13A:
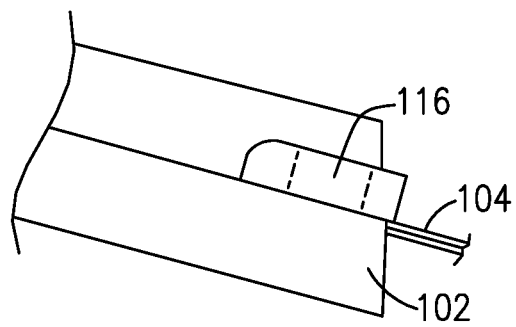
FIG. 13A is a fragmented perspective view of a temporary bulkhead panel showing the locking tab for the upper support.
Figure 13B:
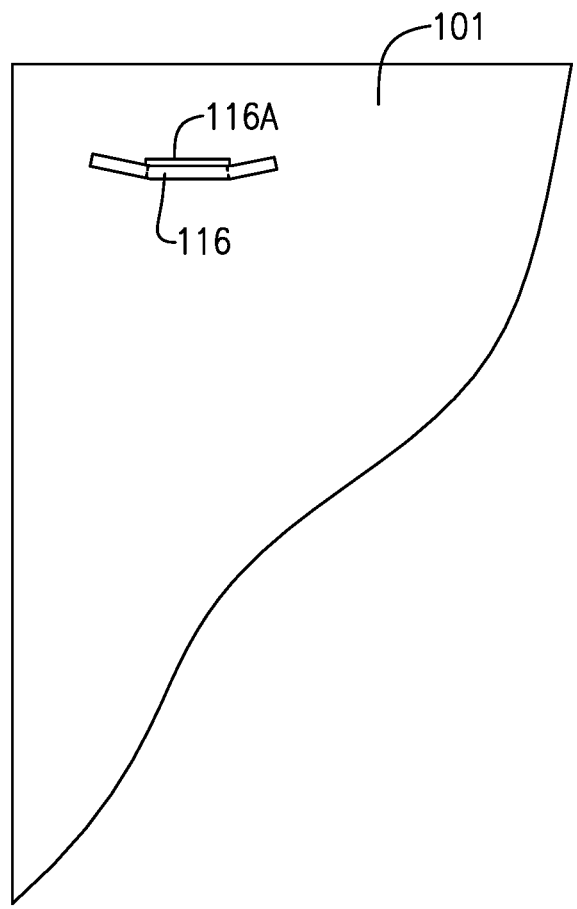
FIG. 13B is an elevational view showing the locking tab extending though the panel.

FIG. 11B is a top view showing the installed position of the temporary bulkhead invention of FIG. 11A in the single open doorway of the shipping container.

A list of all parts follows:

Ref. no. 101—bulkhead panel wall.

Ref. no. 102—folded strengthening section at top of panel 101.

Ref. no. 103—folded flap at bottom of panel 101.

Ref. no. 104—optional, rigid strengthening board for removable insertion into opening created by folded strengthening section 102—board 104 may extend entire length of strengthening element 102, if desired.

Ref. nos. 110A and 110B—identical temporary bulkheads for positioning in double door opening.

Ref. no. 110A'—alternate embodiment of temporary bulkhead for single door opening.

Ref. no. 112—center vertical crease line in temporary bulkhead 110A, 110B.

Ref. no. 114—overlap of divided sections 102 at crease line 112 when temporary bulkhead 110A, 110B is in angled (about crease line 112), installed position.

Ref. no. 116—foldable securing tab for securing strengthen section 102 which may form a triangular shape in cross section.

Ref. no. 116a—open slot in panel 101 for passage of securing tab 116 which may then be folded at fold lines "F" to prevent unintentional withdrawal of tabs 116 from slots 116a.

Ref. no. 118—opposite side edges of bulkhead panel 101 for removably securing bulkhead into vertical slot of shipping container side walls.

Ref. no. 120—same as 118 except for frame opening.

It will be appreciated the bulkheads 110A, 110B, 110A' may be packaged flat and assembled on site for compact packaging and ease of installation.

The dimensions of the bulkheads 110A, 110B and 110A' may be selected according to the respective dimensions of the container or frame opening where they are to be installed.

A Double Door Embodiment may have one or more of the following in any combination:

1. A Temporary Bulkhead for a shipping container that collapses/folds into the opening of a container and locks into position through the designed shape of the material it is made from providing holding support to hold/lock the temporary bulkhead in place. This is achieved through notching creasing, folding and shape and rigidity of material.

2. The rigid inserts that are folded into the Temporary Bulkhead for a shipping container to provide extra strength when needed in the top folded section.

3. The use of layers of corrugated material laminated to provide greater rigidity for heavier flowable products.

4. The use of the triangle stiffening design at the top of the temporary bulkhead.

5. The double inward facing and outward facing angled flaps at the bottom of the temporary bulkhead.

6. The design is stackable due to the modular design to gain greater height to maximize capacity.

A Single Door Embodiment may have one or more of the following in any combination:

1. The single door design has the same profiles and use of laminated product as the double door.

2. The single door has a unique side section that acts as a spacer to allow the second door to close without destroying the top and bottom folded sections.

3. The design is stackable due to the modular design to gain greater height to maximize capacity.

4. The rigid inserts that are folded into the Temporary Bulkhead for a shipping container to provide extra strength when needed in the top folded section.

5. The use of the triangle stiffening design at the top of the temporary bulkhead.

Figure 16A:
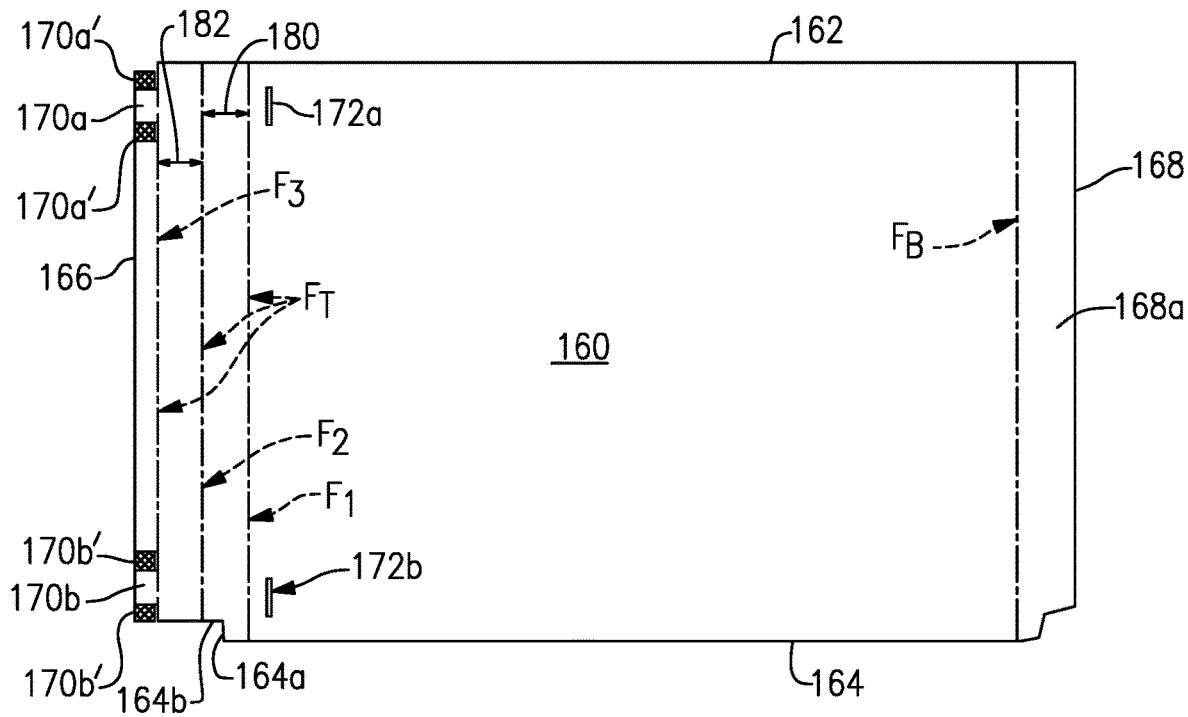
FIGS. 16A and 16B are identical plan views of another embodiment of a single door temporary bulkhead with FIG. 16B including one embodiment of possible dimensions.
Figure 16B:
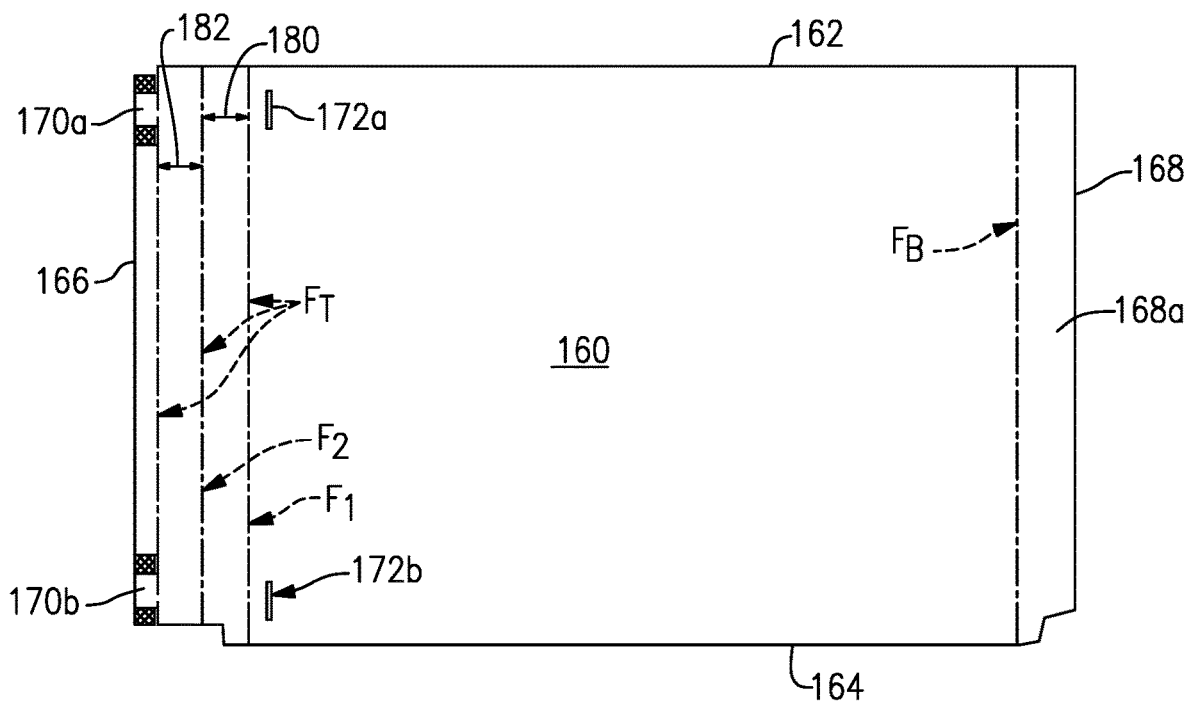

Another embodiment of a seen in FIGS. 16A and 16B are identical plan views of another embodiment of a single door temporary bulkhead 160 in the flat, unfolded condition with FIG. 16B including one embodiment of possible dimensions. Bulkhead 160 includes opposite first and second side edges 162 and 164, respectively and opposite top and bottom edges 166 and 168, respectively. Fold lines adjacent the top edge are indicated by "$F_T$" and may be formed during manufacture as a weakening line or crease to visually identify and facilitate on-site folding of the bulkhead into the folded condition for installation into a shipping container open doorway as seen in FIGS. 16D-16G.

Referring still to 16A and 16B, top edge 166 is seen to include locking tabs 170a and 17b each having a pair of ears 170a' and 170b' on either side thereof which are foldable toward each other to lie against a respective locking tab 170a, 170b while the user inserts the locking tabs 170a', 170b' into the locking tab slots 172a, 172b, respectively. The ears may undergo a further weakening process step during manufacture (e.g., cork crushing) so as to facilitate their folding and insertion through a respective locking tab slot. Prior to inserting the locking tabs the user folds the bulkhead along the upper-most fold lines $F_T$ (consisting of the three fold lines $F_1$, $F_2$ and $F_3$) so as to form the strong triangle shape at the top of the bulkhead (see also FIG. 2C). When in the folded and installed position, panel section 180 located between fold lines F and $F_2$ locates at the upper most extent of the bulkhead and lies along a generally horizontal plane as seen in FIGS. 16F and 16G. Although not seen in FIGS. 16D-16G, bottom panel 168a is folded along fold line $F_B$ so that it may lie flat upon the floor FL of the shipping container SC when in the installed position (facing toward the inside of the shipping container).

Figure 16C:
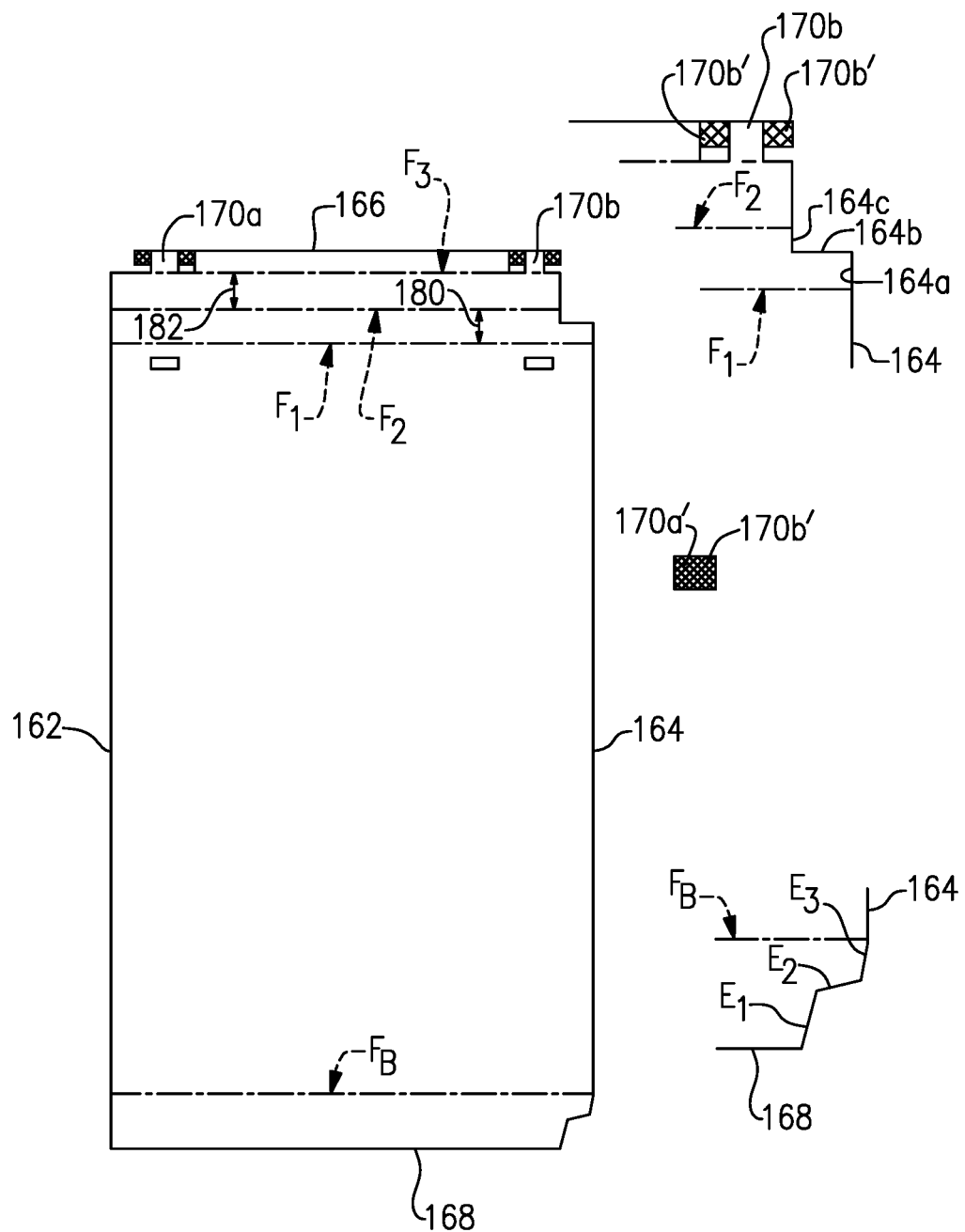
FIG. 16C is a plan view of the temporary bulkhead of FIGS. 16A and 16B showing the opposite side in plan view and including top and bottom edge details with one embodiment of possible dimensions.
Figure 16D:
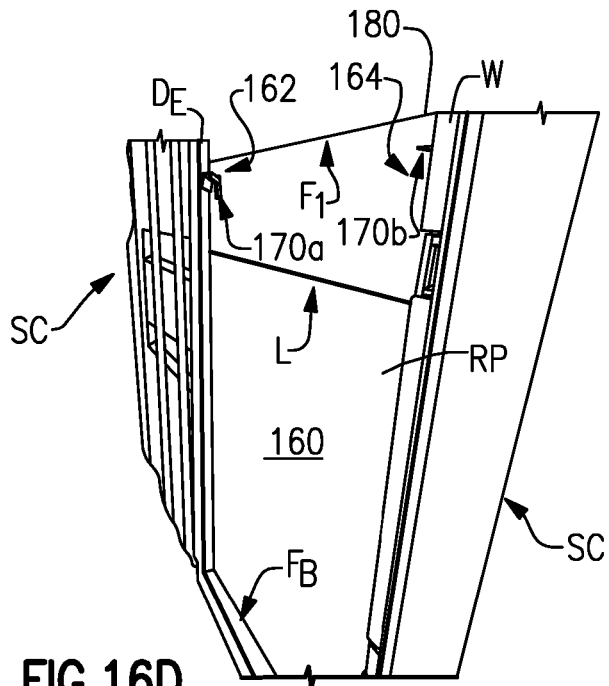
FIGS. 16D-16G are photographs showing various views of the single door temporary bulkhead of FIGS. 16A-16C in the folded condition and installed in the opening of a shipping container in the intended manner.
Figure 16E:
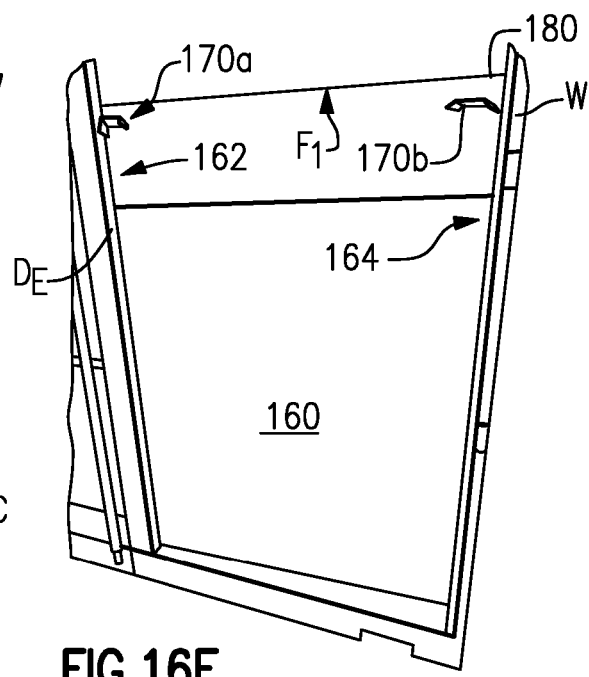
Figure 16F:
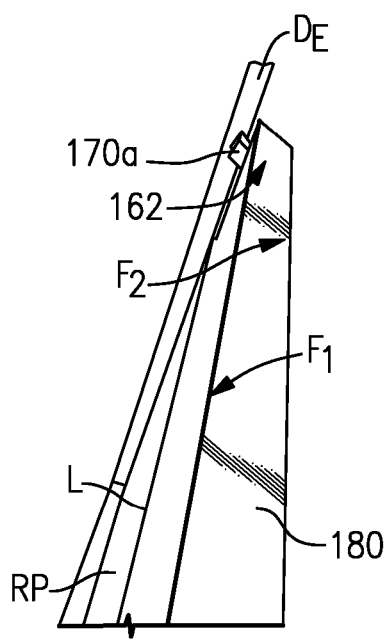
Figure 16G:
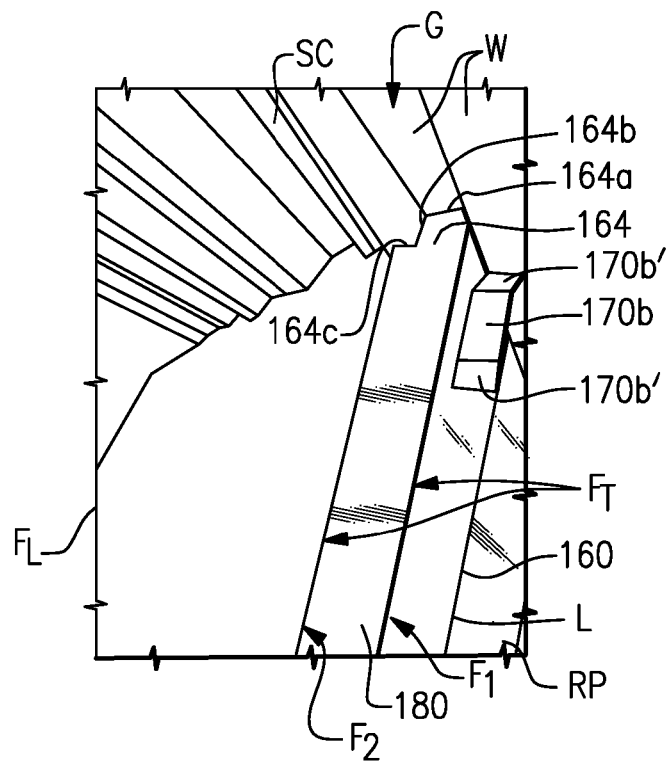

The single door embodiment of bulkhead as seen in FIGS. 16A-16G is intended to be installed in the shipping container opening formed when only one of the double doors is open as seen in FIGS. 16D-16G. To install, the bulkhead is manipulated into the folded condition as explained above and bulkhead side edge 162 is set against (abuts) the inward facing surface of the closed shipping container door adjacent the closed door edge $D_E$ as seen in FIGS. 16D-16F. Placement of locking tab 170a is such that it abuts the door edge $D_E$. The opposite side edge 164 when folded is configured to form a geometry complimentary in shape to the geometry of the corrugated shipping container wall W against which it is positioned as seen in FIG. 16G. Locking tab 170b and tab ear 170b' may also be positioned to abut corrugated wall W.

Referring to the upper edge detail in FIG. 16C in connection with FIG. 16G, when in the installed condition, side edge sections 164a, 164b and 164c form the geometry which fits within the groove G of corrugated wall W of shipping container SC.

With each side edge 162 and 164 secured in the manner described above, temporary bulkhead 160 provides a secure temporary bulkhead for loading of flowable product into the shipping container. If desired, a reinforcing panel RP may be glued or otherwise secured to the main panel of bulkhead 160, the line L indicating the upper edge thereof.

The bottom panel 168a may also include edge detail seen best in FIG. 16C to follow the corresponding geometry of the shipping container wall at the location bottom panel so as to provide a secure attachment point similar to top panel 164. The edge detail includes edges $E_1$-$E_3$ extending between bottom edge 168 and side edge 164. The angle formed between edges $E_1$ and $E_2$ may be an outward facing obtuse angle while the angle formed between edges $E_2$ and $E_3$ may an inward facing obtuse angle where edge $E_3$ forms another inward facing obtuse angle with side edge 164.

Figure 17A:
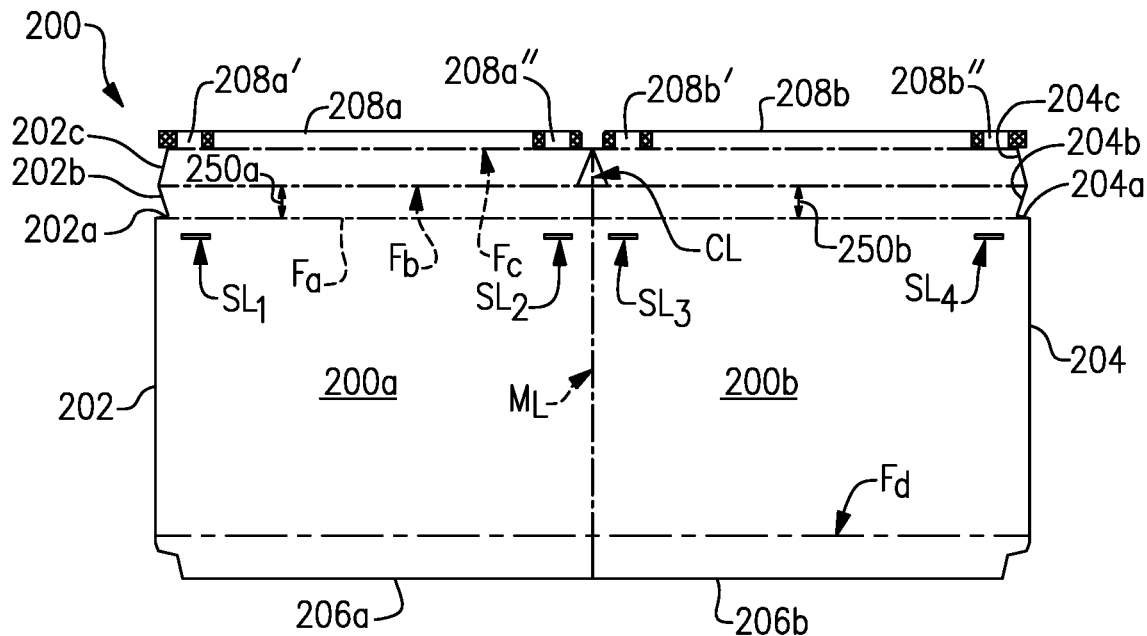
FIGS. 17A and 17B are identical plan views of another embodiment of a double door temporary bulkhead in the unfolded condition with FIG. 17B including one embodiment of possible dimensions.
Figure 17B:
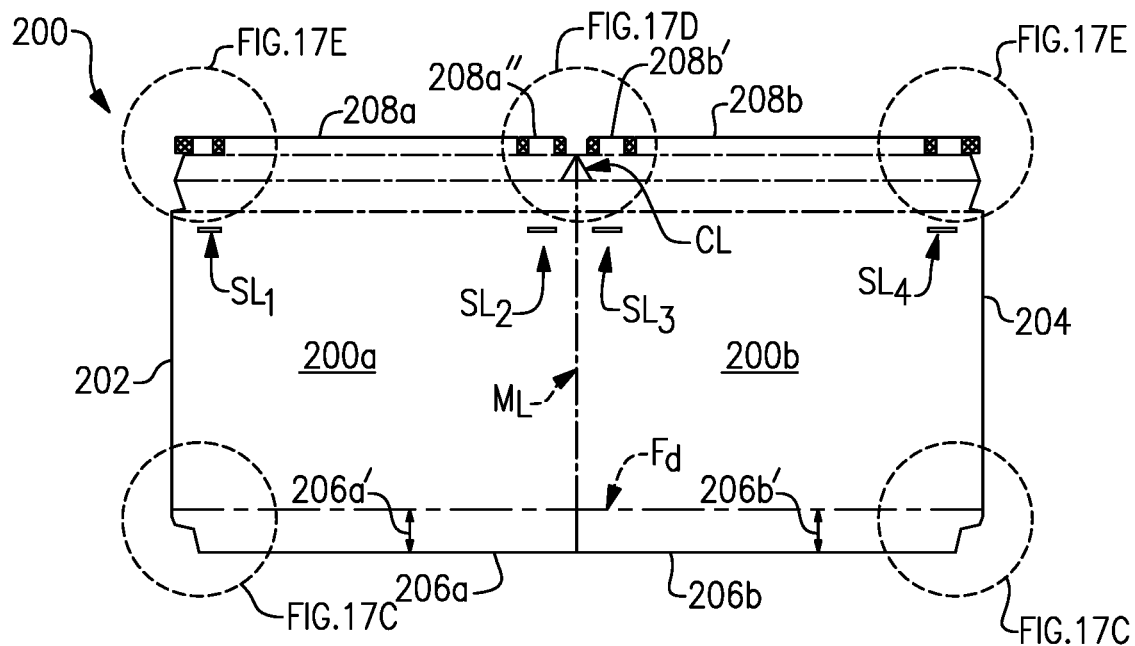

FIGS. 17A and 17B are identical plan views of another embodiment of a double door temporary bulkhead 200 in the unfolded condition with FIG. 17B including one embodiment of possible dimensions. Bulkhead 200 includes two adjoining panel sections 200a and 200b which are mirror images of each other as viewed if folded along center midline $M_L$. Midline $M_L$ may be formed as a crease or weakening line during the manufacturing process to facilitate bending of panels 200a and 200b with respect to each other along line $M_L$. A center lock CL is formed at midline $M_L$ adjacent the top edge and is configured to limit further inward folding of panels 200a and 200b toward each other.

Figure 17D:
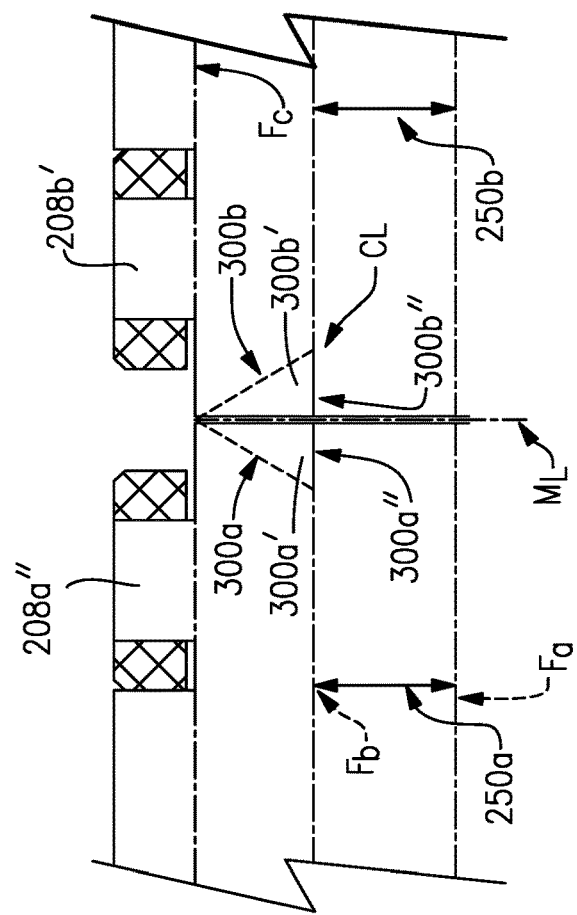
FIG. 17D is an enlarged, fragmented view of the center locks detail call-out circle in FIG. 17B.
Figure 17E:
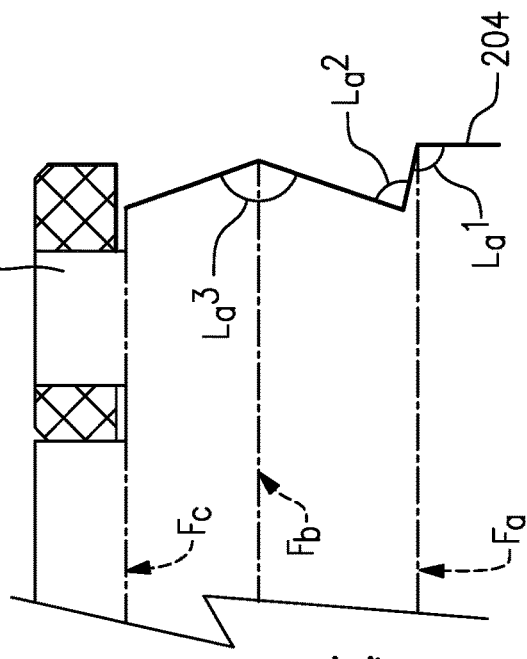
FIG. 17E is an enlarged, fragmented view of the edge lock detail call-out circle in FIG. 17B.

More particularly, center lock CL is formed by panels 200a and 200b being separated from each other at midline $M_L$ from fold line Fa to fold line Fc, and crease lines 300a and 300b being formed at an angle from fold line Fb to fold line Fc. Triangular sections 300a' and 300b' are formed which may fold along their respective crease lines when folding panels 200a and 200b toward each other. The base of each triangle section is cut from the panel at 300a'' and 300b'', this allowing the triangular sections to bend away from the respective panel when a force is applied thereto during folding of the panels toward each other as seen in FIGS. 17D and 17F. When in the installed position, the sections of 250*a* and 250*b* may slide one on top of the other since the panels are separated from each other between sections 250*a* and 250*b*. Thus, as panels 200*a* and 200*b* are folded toward one another along midline ML, one of the triangular sections will be forced by the other to fold inward until the unfolded triangular section or the, if it also folds, the edge where it connects to its respective panel, will abut and form a stop with the edge of the other panel at the location of the folded triangle section to prevent further inward folding of the panels. At the same time the top sections 250*a* and 250*b* may slide along each other, one on top of the other.

Panel 200*a* includes a side edge 202, bottom edge 206*a* and top edge 208*a* which are of the same configuration as respective side edge 204, bottom edge 206*b* and top edge 208*b* of panel 200*b*. Upper fold lines Fa, Fb and Fc traverse along panels 200*a* and 200*b* in parallel, spaced relation to each other and to top edges 208*a* and 208*b* which themselves extend collinear to each other when in the unfolded condition.

Top edge 208*a* includes locking tabs 208*a*' and 208*a*" each having a pair of respective foldable ears for folding and inserting though respective locking tab slots SL1 and SL2 when manipulating bulkhead 200 into the folded condition to ready for installation to a shipping container SC. Likewise, top edge 208*b* includes locking tabs 208*b*' and 208*b*" each having a pair of respective foldable ears for folding and inserting though respective locking tab slots SL3 and SL4 when manipulating bulkhead 200 into the folded condition by folding along lines Fa, Fb and Fc to ready bulkhead 200 for installation to a shipping container SC as seen in FIG. 17F. When folded in this manner, side edges 204*a*, 204*b* and 204*c* are configured in a geometry which follows the contour of the shipping container wall W at the door opening as seen best in FIG. 17G. The same folded configuration and fit to the container wall at the opposite side of the container is provided by panel 200*a* by edges 202*a*, 202*b* and 202*c*.

Edges 202*a* and 204*a* extend at an inward facing obtuse angle $a^1$ with their respective side edges 202 and 204. Edges 202*a* and 204*a* further form an outward facing acute angle $a^2$ with respective side edges 202*b* and 204*b*. Edges 202*b* and 204*c* form an obtuse angle $a^3$ with respective side edges 202*c* and 204*c*. Upon folding a wedge portion 204*d* is formed which provides added strength against outward forces bearing against bulkhead 200 from product loaded into shipping container SC. An identical wedge portion is formed at panel 200*a* by edges 202*a* and 202*b* (FIG. 17F).

Figure 17C:
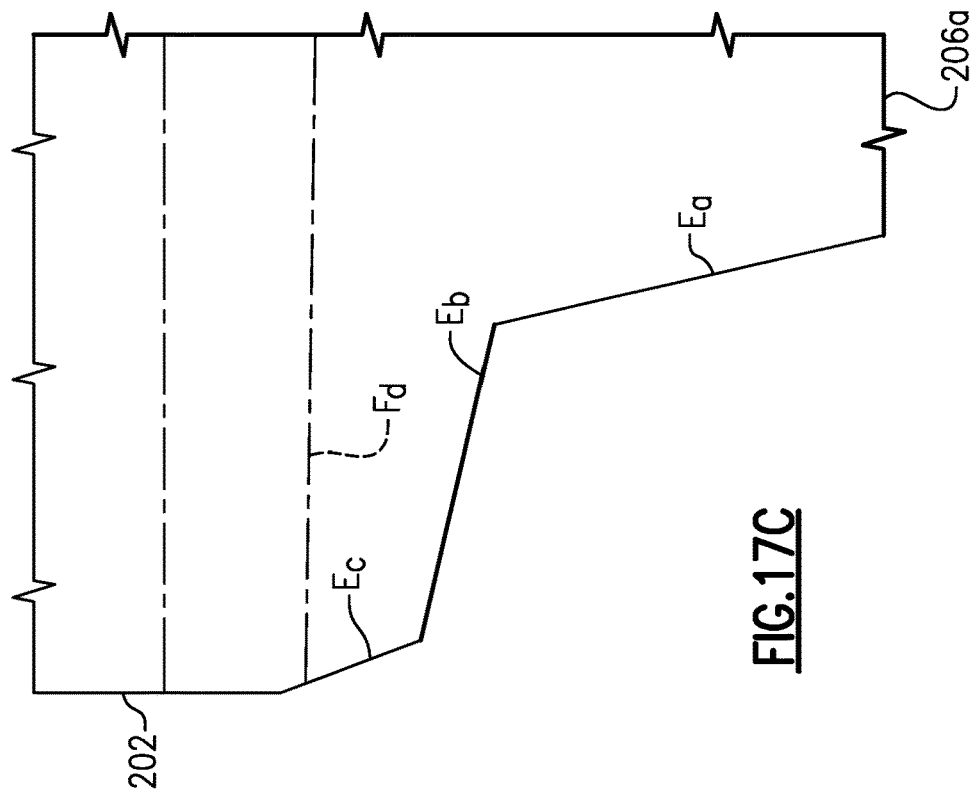
FIG. 17C is an enlarged, fragmented view of the edge detail call-out circle in FIG. 17B.
Figure 17G:
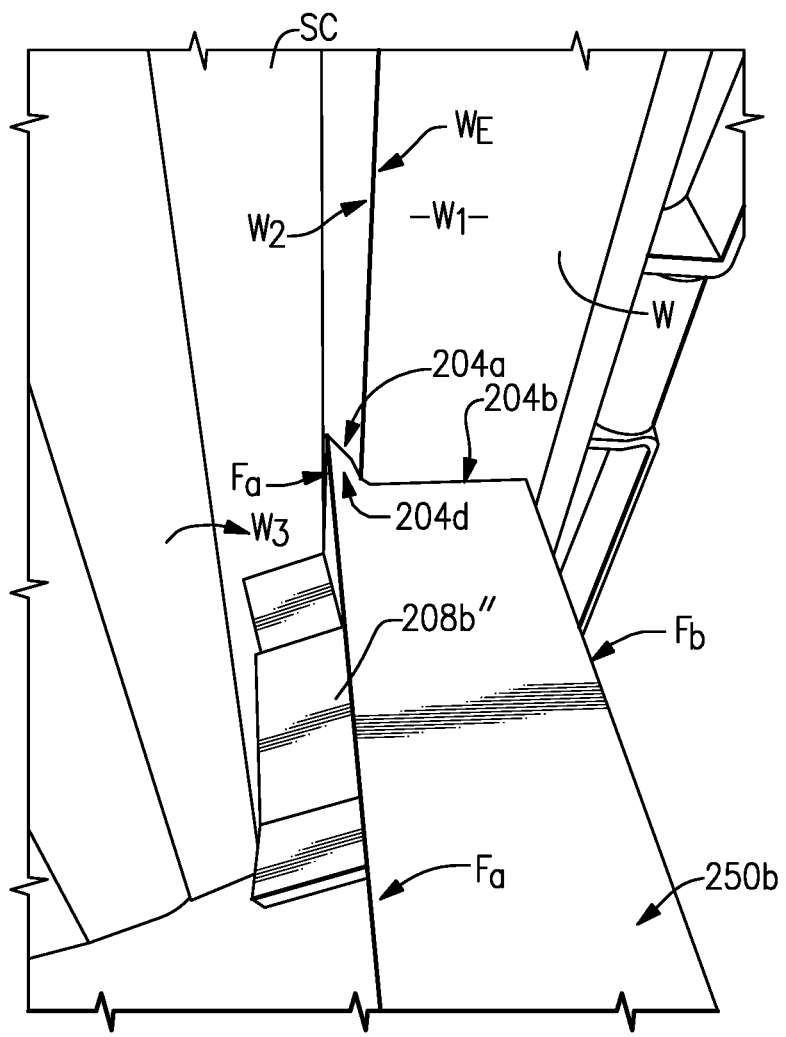
FIG. 17G is a photograph showing a close up view of an edge engaged with the shipping container door opening.

The double door embodiment of bulkhead 200 as seen in FIGS. 17A-17F is intended to be installed in the shipping container opening formed when both double doors are open as seen in FIGS. 17G and 17F. To install, the bulkhead 200 is manipulated into the folded condition as explained above and bulkhead edges 204*a* and 204*b* are placed against shipping container wall surfaces W1 and W2, respectively. As seen best in FIG. 17G, wall surfaces W1 and W2 extend at an approximately right angle to each other. Placement of locking tab 208*b* is such that it lies closely adjacent wall surface W3. The opposite side edge 202 when folded is configured the same as edges 204*a*, 204*b* and 204*c* to form a geometry complimentary in shape to the geometry of the corrugated shipping container wall W against which it is positioned as seen in FIG. 16G. Locking tab 170*b* and tab ear 170*b*' may also be positioned to abut corrugated wall W.

Referring to the upper edge detail in FIG. 16C in connection with FIG. 16G, when in the installed condition, side edge sections 164*a*, 164*b* and 164*c* form the geometry which fits within the groove G of corrugated wall W of shipping container SC.

With each side edge 162 and 164 secured in the manner described above, temporary bulkhead 160 provides a secure temporary bulkhead for loading of flowable product into the shipping container.

The bottom edges 206*a* and 206*b* may also include edge detail seen best in FIG. 17C to follow the corresponding geometry of the shipping container wall at the location of the bottom panel 206*a*' and 206*b*' so as to provide a secure attachment point similar to the top. The edge detail includes edges Ea-Ec extending between bottom edge 206*a* and side edge 202. The angle formed between edges Ea and Eb may be an outward facing obtuse angle while the angle formed between edges Eb and $E_c$ may an inward facing obtuse angle where edge Ec forms another inward facing obtuse angle with side edge 202. The same configuration is at panel 200*b* since the panels are mirror images of each other as explained above.

While this method and apparatus has been shown and described with reference to certain preferred embodiments thereof, it will be understood by those skilled in the art that various changes in form and details may be made therein without departing from the spirit and scope of the invention as described.

What is claimed is:

1. A temporary bulkhead for a corrugated shipping container having a rear wall, a top wall, a bottom wall, a corrugated right side wall, a corrugated left side wall and left and right outwardly swinging doors forming a front wall when closed, all defining a container interior, the temporary bulkhead comprising a bulkhead panel having opposing first and second side edges and opposing top and bottom edges all defining a panel inner face and a panel outer face, wherein:

a) a plurality of fold lines is defined within said panel adjacent to said top edge,
wherein a first fold line delineates said panel into a panel body defined by said first fold line, said first and second side edges and said bottom edge, and a panel section defined by said first fold line, said top edge and opposite first and second side edge sections, each side edge having an inner portion and an outer portion,
wherein a second fold line is located between said top edge and said first fold line, said second fold line delineating said panel section into a first panel section defined by said first fold line, said second fold line and said inner portions of said first and second side edge sections, and a second panel section defined by the second fold line, said top edge and said outer portion of said first and second side edge sections;

b) first and second locking tabs defined along said top edge proximate said outer portion of said first and second side edge sections, respectively; and c) first and second slots defined within said panel body adjacent said first fold line and proximate said first and second side edges, respectively,
wherein, said panel is configured to fold at said first fold line and said panel section is configured to fold at said second fold whereby said first panel section is configured to fold at an angle relative to said panel body and said second panel section is configured to fold whereby said locking tabs pass through respective said slots to form a folded bulkhead.

2. The temporary bulkhead of claim 1 wherein when mounted within either an open first or second door of the corrugated shipping container, one of said first or second locking tabs engages a door edge of a closed door of the other first or second door, and the other of said first and second locking tabs engages one or the other of said corrugated left or right side wall, and wherein said side edge section of said the other of said first and second locking tabs seat within a corrugation within said the other of said corrugated left or right side wall.

3. The temporary bulkhead of claim 1 wherein each of said first and second locking tabs includes at least one locking ear foldably attached thereto, wherein said locking ear is folded over said locking tab when said locking tab passes through said slot and wherein said locking ear is unfolded after said locking tab passes through said slot to prevent unwanted reverse passage of said locking tab from said slot.

4. The temporary bulkhead of claim 1 wherein said first panel section is configured to fold perpendicularly to said panel body.

5. The temporary bulkhead of claim 1 wherein said bulkhead panel further includes a bottom fold line adjacent said bottom edge and defining a bottom panel and opposing first and second bottom panel side edges between said bottom fold line and said bottom edge.

6. The temporary bulkhead of claim 5 wherein said second bottom panel side edge has a profile complementary to said corrugation within said the other of said corrugated left or right side wall.

7. The temporary bulkhead of claim 6 wherein said second bottom panel side edge includes first, second and third side edge portions, wherein an outward facing obtuse angle is formed between said first side edge portion and said second side edge portion, an inward facing obtuse angle is formed between said second side edge portion and said third side edge portion, and an inward facing obtuse angle is formed between said third side edge portion and said second bottom panel side edge.

8. The temporary bulkhead of claim 1 wherein said bulkhead panel further includes a reinforcing panel secured to said panel body.

9. A temporary bulkhead for a corrugated shipping container having a rear wall, a top wall, a bottom wall, a corrugated right side wall, a corrugated left side wall and left and right outwardly swinging doors forming a front wall when closed, all defining a container interior, the temporary bulkhead comprising a bulkhead panel including left and right adjoining panels joined along a common center midline, each adjoining panel having a side edge and opposing top and bottom edges, wherein:

a) a plurality of fold lines is defined within said bulkhead panel adjacent to said top edges,
wherein a first fold line delineates said bulkhead panel into a left panel body defined by said first fold line, said left adjoining panel side edge, said left adjoining panel bottom edge and said center midline and a right panel body defined by said first fold line, said right adjoining panel side edge, said right adjoining panel bottom edge and said center midline; and a left panel section defined by said first fold line, said left adjoining panel top edge, said left adjoining panel side edge section and said center midline and a right panel section defined by said first fold line, said right adjoining panel top edge, said right adjoining panel side edge section and said center midline, wherein each adjoining panel side edge section includes an upper portion and a lower portion,
wherein a second fold line is located between said top edges and said first fold line, said second fold line delineating said left panel section into a first left panel section defined by said first fold line, said second fold line, said center midline and said lower portion of said left adjoining panel side edge section and a second left panel section defined by said second fold line, said top edge, said center midline and said upper portion of said left adjoining side edge section; and said second fold line delineating said right panel section into a first right panel section defined by said first fold line, said second fold line, said center midline and said lower portion of said right adjoining panel side edge section and a second left panel section defined by said second fold line, said top edge, said center midline and said upper portion of said right adjoining side edge section;

b) respective pairs of first and second locking tabs defined along each of said top edges, each said first locking tab proximate its respective adjoining panel side edge and each said second locking tab proximate said center midline;

c) respective pairs of first and second slots defined within each of said left and right panel bodies adjacent said first fold line and registered to engage a corresponding said respective first and second locking tabs,
wherein, said bulkhead panel is configured to fold at said first fold line and each of said left and right panel sections is configured to fold at said second fold whereby each of said first left panel section and said first right panel section is configured to fold at an angle relative to said left and right panel bodies, respectively, and each of said second left panel section and said second right panel section is configured to fold whereby each of said locking tabs passes through respective said slots to form a folded bulkhead.

10. The temporary bulkhead of claim 9 wherein when mounted within the corrugated shipping container, each of said first locking tabs engages a respective container left or right side wall, and wherein when mounted within the corrugated shipping container, each of said second locking tabs engages one another to limit folding of said bulk head panel about said center midline.

11. The temporary bulkhead of claim 9 wherein each of said respective first and second locking tabs includes at least one locking ear foldably attached thereto, wherein said locking ear is folded over said locking tab when said locking tab passes through said slot and wherein said locking ear is unfolded after said locking tab passes through said slot to prevent unwanted reverse passage of said locking tab from said slot.

12. The temporary bulkhead of claim 9 wherein each of said first left panel section and said first right panel section is configured to fold perpendicularly to said left panel body and said right panel body, respectively.

13. The temporary bulkhead of claim 9 wherein said bulkhead panel further includes a bottom fold line adjacent each of said left panel bottom edge and said right panel bottom edge, and defining a left bottom panel and a right bottom panel, respectively.

14. The temporary bulkhead of claim 13 wherein each of said left and right adjoining panel side edge defining said left bottom panel and said right bottom panel, respectively, has a profile complementary to said corrugation within said corrugated side wall of said corrugated shipping container.

15. The temporary bulkhead of claim 14 wherein each of said left and right bottom panel side edges includes first, second and third side edge portions, wherein an outward facing obtuse angle is formed between said first side edge portion and said second side edge portion, an inward facing obtuse angle is formed between said second side edge portion and said third side edge portion, and an inward facing obtuse angle is formed between said third side edge portion and said left and right bottom panel side edge, respectively.

16. The temporary bulkhead of claim 9 wherein said bulkhead panel further includes one or both of a left reinforcing panel secured to said left panel body and a right reinforcing panel secured to said right panel body.

17. The temporary bulkhead of claim 9 wherein said bulkhead panel further includes a center lock configured to limit folding of said bulk head panel about said center midline.

18. The temporary bulkhead of claim 9 wherein said left panel body and said right panel body are configured to be disposed at an angle with a vertex facing said container interior when said bulkhead panel is positioned within said corrugated shipping container.

* * * * *